(12) United States Patent
Cho

(10) Patent No.: US 7,778,647 B2
(45) Date of Patent: Aug. 17, 2010

(54) LOCATION BASED SERVICE FOR POINT-TO-MULTIPOINT BROADCASTING

(75) Inventor: Nam-Shin Cho, Seoul (KR)

(73) Assignee: LG Electronics, Inc., Seoul (KR)

( * ) Notice: Subject to any disclaimer, the term of this patent is extended or adjusted under 35 U.S.C. 154(b) by 290 days.

(21) Appl. No.: 11/234,436

(22) Filed: Sep. 23, 2005

(65) Prior Publication Data

US 2006/0079246 A1 Apr. 13, 2006

(30) Foreign Application Priority Data

Sep. 24, 2004 (KR) .................. 10-2004-0077378

(51) Int. Cl.
*H04W 24/00* (2009.01)
(52) U.S. Cl. .................. 455/456.1; 455/456.3
(58) Field of Classification Search .... 455/456.1–456.6
See application file for complete search history.

(56) References Cited

U.S. PATENT DOCUMENTS

| 5,528,247 A * | 6/1996 | Nonami .................. 342/357.1 |
| 2004/0203863 A1* | 10/2004 | Huomo .................. 455/456.1 |
| 2005/0059409 A1* | 3/2005 | Vare et al. ................ 455/456.1 |
| 2005/0068977 A1* | 3/2005 | Na et al. .................... 370/432 |

FOREIGN PATENT DOCUMENTS

| DE | 19638515 A1 | 4/1998 |
| DE | 19905430 A1 | 8/2000 |
| EP | 0902563 A1 | 3/1999 |
| EP | 1261154 A2 | 11/2002 |
| JP | 09-051314 | 2/1997 |
| JP | 2000-244350 | 9/2000 |
| JP | 2001168875 | 6/2001 |
| JP | 2004109139 | 4/2004 |
| KR | 1020030036540 A | 9/2003 |
| WO | WO 9914775 A | 3/1999 |
| WO | WO 0030379 A | 5/2000 |

\* cited by examiner

*Primary Examiner*—Lester Kincaid
*Assistant Examiner*—Steven Lim
(74) *Attorney, Agent, or Firm*—Lee, Hong, Degerman, Kang & Waimey

(57) ABSTRACT

A method for providing a location based service (LBS) in a point-to-multipoint broadcasting system comprises, in a mobile station, receiving a transmitter identifier (ID) from a point-to-multipoint transmitter, and obtaining location information based on the transmitter ID. The method also comprises determining a service area for the LBS based on obtained location information, in the mobile station. The method may further comprise updating stored location information in the mobile station based on the obtained location information. The method may further comprise receiving an LBS selection from a user, and transmitting the LBS selection to the point-to-multipoint transmitter. The method may further comprise receiving the LBS from the point-to-multipoint transmitter based on transmitted LBS selection. The point-to-multipoint broadcasting system may comprise a digital multimedia broadcast (DMB) system. The DMB system may comprise at least one of a satellite DMB system and a terrestrial DMB system.

28 Claims, 4 Drawing Sheets

LOCATION BASED SERVICE FOR POINT-TO-MULTIPOINT BROADCASTING

CROSS-REFERENCE TO RELATED APPLICATIONS

Pursuant to 35 U.S.C. §119(a), this application claims the benefit of earlier filing date and right of priority to Korean Application No. 2004-0077378, filed on Sep. 24, 2004, the contents of which are hereby incorporated by reference herein in their entirety.

FIELD OF THE INVENTION

The present invention relates generally to a location based service (LBS) and, more particularly, to a location based service for point-to-multipoint broadcasting, such as digital multimedia broadcasting (DMB).

BACKGROUND OF THE INVENTION

A location based service (LBS) refers to a mobile communication service that utilizes location information of a mobile station (e.g., a user with a mobile station) to provide real-time location based information to the user, such as traffic or weather information. The LBS may be either a bi-directional LBS or a unidirectional LBS for a satellite DMB (digital multimedia broadcast) and a terrestrial DMB.

The satellite DMB and the terrestrial DMB may provide multimedia services, whereas digital audio broadcasting (DAB) provides only an audio service. DMB has been limited in application to LBS for several reasons. One such reason is that a DMB terminal only receives multimedia information and digital data transmitted through a DMB transmitter of a DMB system. The DMB transmitter, however, is not provided with a separate broadcasting terminal or with a unit to manage such a separate broadcasting terminal.

Unidirectional LBS for DMB, however, may be implemented using a Eureka-147 communication network to provide a transmitter ID to a transmitter to manage each cell, as described further below with respect to FIG. 1.

FIG. 1 is a diagram illustrating provision of a transmitter ID in a conventional Eureka-147 communication network.

Referring to FIG. 1, each transmitter is provided with a plurality of sub-class IDs. Each sub-class ID is composed of main IDs and sub IDs. The main IDs designated by "00" distinguish the entire region from another region. The sub IDs designated by "00_xx" identify each transmitter.

The conventional LBS system is based on a mobile communication service, and is divided into a network based method and a GPS based method, according to a method for obtaining a mobile station user's location information.

The network based method is a cell ID method that identifies to which cell of a mobile communication network that a mobile station that has been powered on by a user belongs. The corresponding cell (e.g., base station) may thus be registered to a mobile communication network system. The mobile station and the cell transmit and receive location information at a constant rate, and location information of the mobile station is registered to the system whenever the cell changes as the user moves. Accordingly, the system may identify to which cell of the mobile communication network the mobile station belongs.

The GPS based method serves to identify a location of the mobile station by the system as the mobile station obtains precise location information using a GPS chip mounted therein to report the location information to a base station.

In the conventional LBS system, when the mobile station reports obtained location information to a corresponding cell (or base station), the LBS system provides a specified service to the user based on the reported location information. Accordingly, information and services provided to the user may differ according to the user's location inside each cell of the mobile communication network.

Furthermore, in the conventional LBS system, the user's location information must be reported to the base station, which may result in a compromise to the user's privacy. Also, because services are provided based on the bi-directional mobile communication network, the LBS system may not be applied to a unidirectional broadcasting system. Additionally, since specified information and service are provided to the user according to the user's location cell, a more expensive fee may be charged to the user than in a unidirectional broadcasting system.

SUMMARY OF THE INVENTION

Accordingly, the present invention is directed to a location based service (LBS) for point-to-multipoint broadcasting that substantially obviates one or more problems due to limitations and disadvantages of the related art.

An object of the present invention is to provide a unidirectional location based service (LBS) that utilizes location information of transmitters in both a satellite digital multimedia broadcast (DMB) system and a terrestrial DMB system.

Another object of the present invention is to provide a LBS for a satellite DMB and a terrestrial DMB, capable of protecting a user's location information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for providing a location based service (LBS) in a point-to-multipoint broadcasting system comprises, in a mobile station, receiving a transmitter identifier (ID) from a point-to-multipoint transmitter, and obtaining location information based on the transmitter ID. The method also comprises determining a service area for the LBS based on obtained location information, in the mobile station.

The method may further comprise updating stored location information in the mobile station based on the obtained location information. The method may further comprise receiving an LBS selection from a user, and transmitting the LBS selection to the point-to-multipoint transmitter. The method may further comprise receiving the LBS from the point-to-multipoint transmitter based on transmitted LBS selection.

The point-to-multipoint broadcasting system may comprise a digital multimedia broadcast (DMB) system. The DMB system may comprise at least one of a satellite DMB system and a terrestrial DMB system. The method may further comprise determining whether the received LBS data is according to the transmitted LBS selection. The service area and a type of LBS service may be selected from a preset menu in the mobile station by a user. The service area may comprise a specific cell or a plurality of cells inside a DMB communication network. The service area may comprise an administration district unit or a circle radius range in the DMB communication network.

The LBS may be included in a data frame received from the point-to-multipoint transmitter. The data frame may comprise an identifier for identifying broadcasting image data and LBS data. The data frame may comprise an area identifier for identifying area information in LBS data. The data frame may comprise an information identifier for identifying types of information in LBS data.

In another embodiment, a method provides a location based service (LBS) in a point-to-multipoint broadcasting system, in which a mobile station obtains and updates location information based upon a transmitter identifier (ID) received from a point-to-multipoint transmitter.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A unidirectional location based service (LBS) for a point-to-multipoint broadcasting system, such as a DMB (digital multimedia broadcast) system, is disclosed. The DMB system may be a satellite DMB system and/or a terrestrial DMB system. The present invention may also be applied to a wireless communication system operated according to different standards.

A user is provided with a LBS as a mobile station receives a DMB transmitter ID from a DMB transmitter of a satellite DMB system and/or a terrestrial DMB system to obtain location information. Accordingly, in the unidirectional LBS system, the mobile station may report location information to a base station (or cell) in a similar fashion to a bi-directional LBS system.

To implement the unidirectional LBS system, the following elements may be included. A first element is a satellite DMB system and/or a terrestrial DMB system provided with a plurality of cells suitable for a wave circumstance. A second element is a DMB system for transmitting LBS data and broadcasting image data to a DMB transmitter of each cell. A third element is a DMB transmitter inside each of the cells for transmitting an associated DMB transmitter ID with the LBS data and the broadcasting image data transmitted from the DMB system. A fourth element is a broadcasting terminal for obtaining and updating its own location information inside a communication network through a geographical information database (DB) by receiving each transmitter ID, and for receiving the LBS data and the broadcasting image data.

The LBS data and the broadcasting image data may be transmitted as a data frame form. The LBS data may comprise an identifier for identifying an amount of data of the data frame. The LBS data may include, for example, traffic information, weather information, coupon information, restaurant information, hospital information, department store information, flower delivery information, moving company information, and/or cultural information such as cinema information and play information. The LBS data may all pertain to the location of the mobile station, as defined by the transmitter ID. The LBS data in the data frame may comprise an information identifier for identifying each type of information, and an area identifier for identifying area information inside a communication network.

The transmitter ID may be transmitted to the mobile station by inclusion in the data frame, according to a suitable communication circumstance. Furthermore, the transmitter ID may be transmitted to the mobile station through an additional channel in the data frame.

Figure 2:
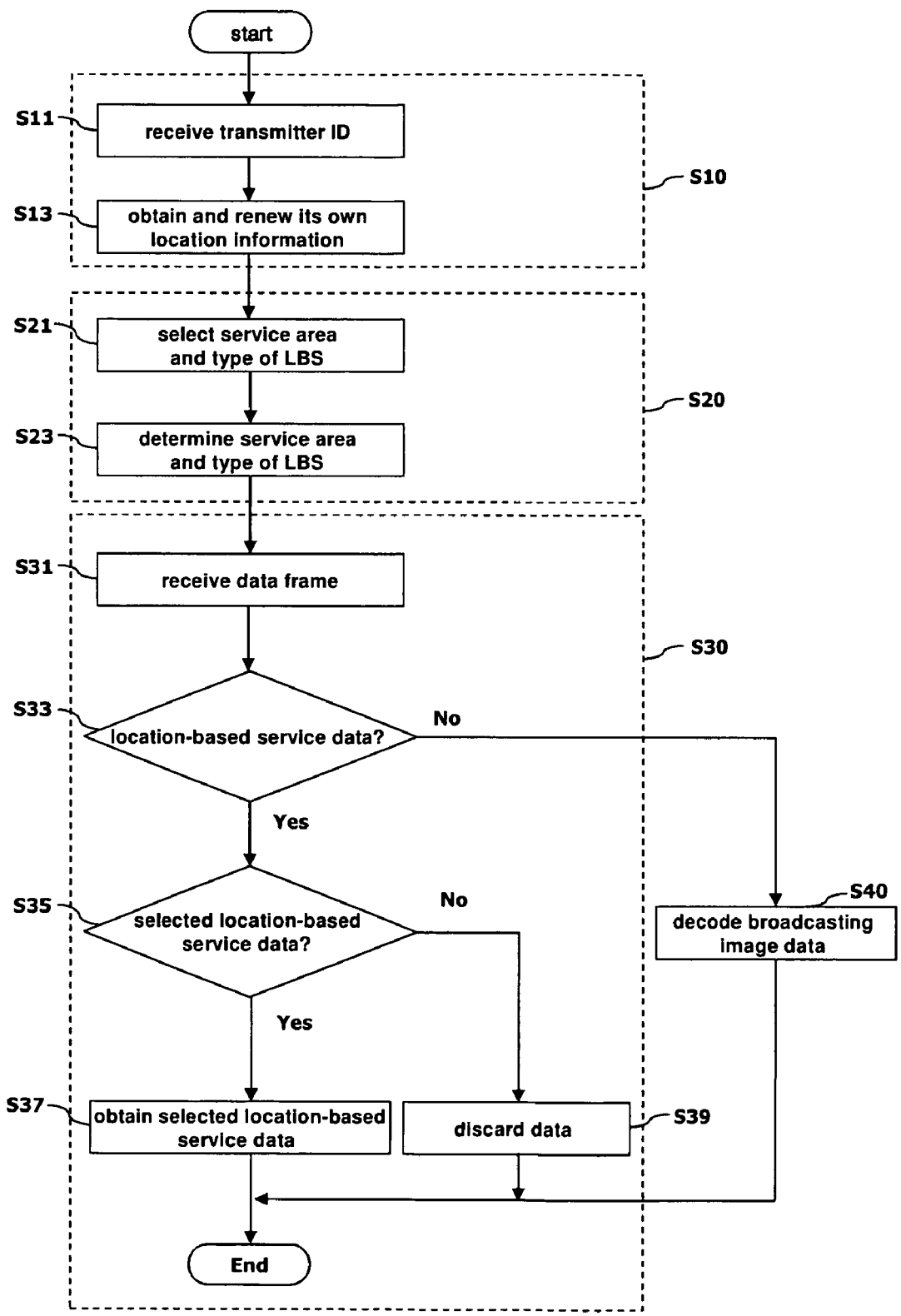
FIG. 2 is a flow diagram illustrating a method for providing a location based service, according to an embodiment of the present invention.
Figure 3:
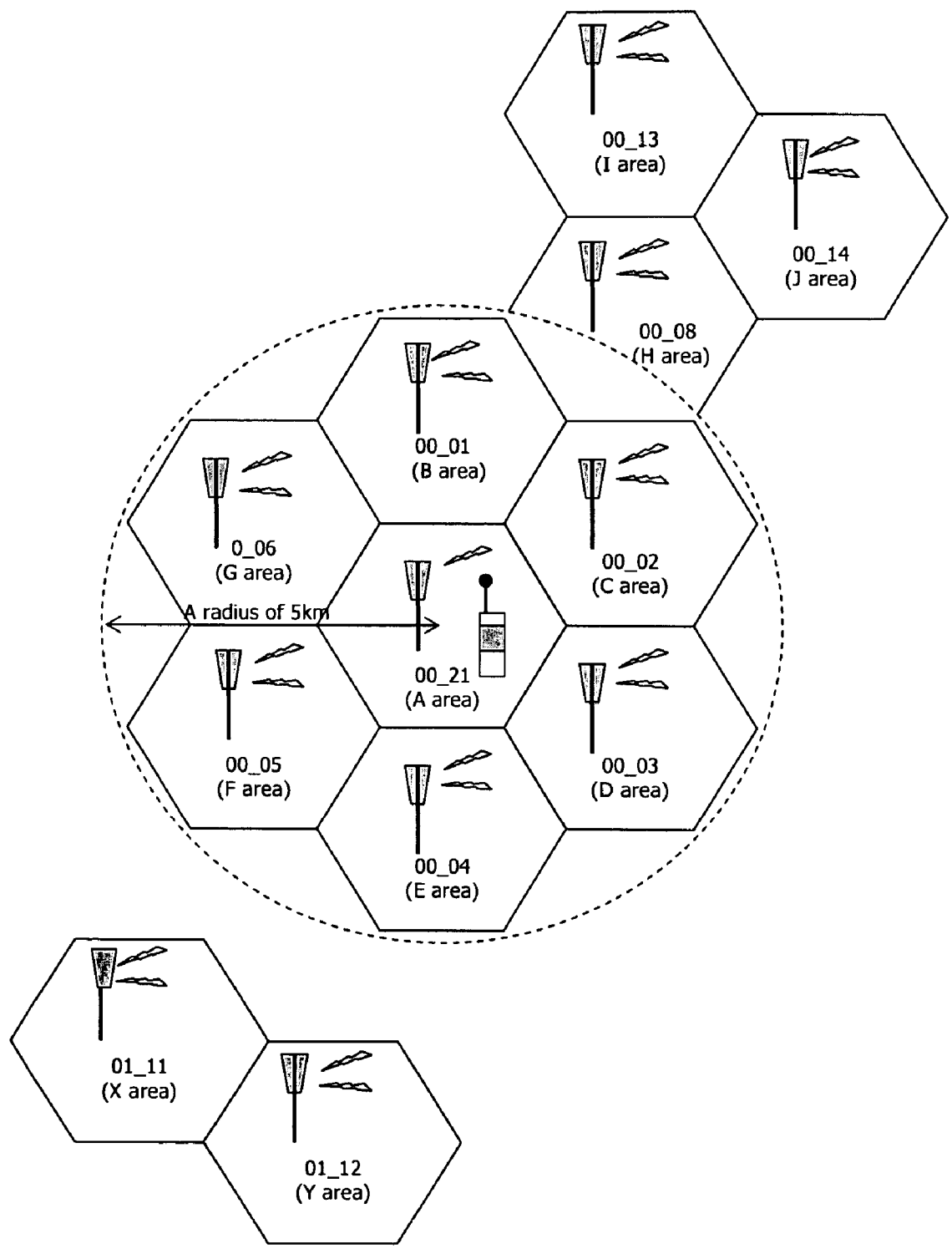
FIG. 3 is a diagram illustrating an obtaining of location based information using a transmitted ID, according to an embodiment of the present invention.
Figure 4:
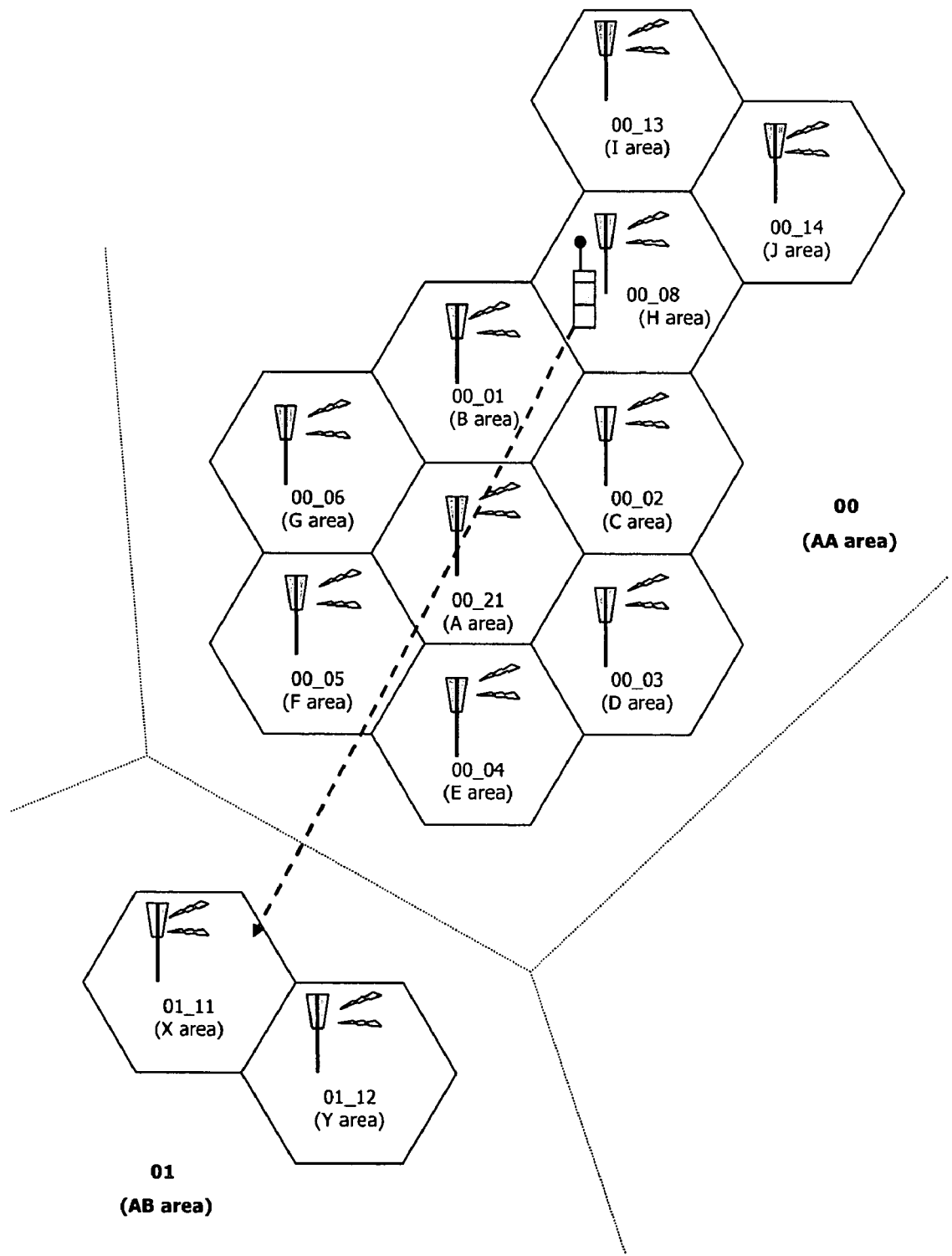
FIG. 4 is a diagram illustrating an obtaining of location based information using a transmitter ID, according to another embodiment of the present invention.

FIG. 2 is a flow diagram illustrating a method for providing a location based service, according to an embodiment of the present invention. FIG. 3 is a diagram illustrating an obtaining of location based information using a transmitter ID, according to an embodiment of the present invention. The embodiment depicted in FIG. 3 may, for example, be used for obtaining location based restaurant information. FIG. 4 is a diagram illustrating an obtaining of location based information using a transmitter ID, according to another embodiment of the present invention. The embodiment depicted in FIG. 3 may, for example, be used for obtaining location based traffic information.

Referring now to FIGS. 2 and 3, when the mobile station moves within a cell where a DMB transmitter of a DMB communication network is located (e.g., area 'A'), the mobile station receives a transmitter ID (e.g., 00_21) transmitted from the transmitter (S11). The mobile station also obtains location information (e.g., area 'A'), such as through a geographical information DB of the mobile station (S13). If the mobile station moves to another cell (e.g., 00_01: area 'B'), location information associated with the mobile station is updated via steps S11 and S13 (S10). The location of the mobile station may also be obtained with additional precision via a triangular measuring method that uses a signal power transmitted from a plurality of transmitters. The obtained location may be displayed on a map provided (e.g., from a geographical information DB) through a display unit of the mobile station.

If the user with the mobile station moves to an adjacent location, such as a restaurant, the user may designate an LBS area range (e.g., a radius of 5 km from a current location) and a type of LBS information (e.g., restaurant) by using a preset menu in the mobile station to select an LBS area range for the adjacent restaurant (S21). Referring to FIG. 3, cells (00_01:

area 'B') to (00__06: area 'G') are within the radius of 5 km from the user's current location (e.g., area 'A'). Accordingly, the user may identify the administration areas (A, B, C, D, E, F, and G) to which each cell (00__21, 00__01~00__06) correspond within the selected radius through the geographical information DB of the mobile station. The selected LBS area (A, B, C, D, E, F, and G) and the type of information (e.g., restaurant) may thereby be determined (S23).

The DMB system may transmit a data frame that includes broadcasting image data and LBS data to each DMB transmitter. Then, the mobile station may receive the data frame transmitted to each DMB transmitter (S31), and determine whether LBS data has been included in the received data frame (S33). If the received data frame does not include a LBS data identifier in the step S33, the data is determined to be broadcasting image data to undergo a decoding process (S40). However, if the received data frame includes a LBS data identifier, the data is determined to be LBS data. The mobile station then determines whether the LBS data corresponds to the selected LBS data (e.g., restaurants inside the areas 'A, B, C, D, E, F, and G') (S35). That is, since the LBS data frame includes an area identifier for identifying each area (e.g., A~J, X, Y, AA, AB), and an information identifier for identifying each type of information (e.g., restaurant, traffic, and/or coupon), the selected LBS data (e.g., restaurant inside A, B, C, D, E, F, and G area) associated with only the selected area (e.g., A, B, C, D, E, F, and G) and the selected type of information (e.g., restaurant) is obtained (S37). The LBS data obtained in the step (S37) may be stored in a memory of the mobile station or may be displayed on a display unit. The LBS data that is not selected is then discarded (S39).

Referring now to FIGS. 2 and 4, when the user with the mobile station located in the area 'H' desires to obtain traffic information related to the corresponding area while driving from the area 'AA' (00) to the area 'AB' (01), the mobile station may receive a DMB transmitter ID (00__08) and obtain the location information (e.g., area 'H'), such as through the geographical information DB of the mobile station (S10). The user may then select an LBS area (e.g., from AA to AB) and a type of information (e.g., traffic) in a preset menu provided in the mobile station, and may determine the LBS area and the type of information through the geographical information DB of the mobile station (S20). The mobile station may then determine whether the data frame transmitted from the DMB system has a corresponding LBS data identifier to certify whether or not LBS data exists (S33). The mobile station may certify an area identifier and an information identifier (S35) to obtain the selected LBS data (e.g., traffic information from the area 'AA' to the area 'AB') from among the LBS data (S37).

In one embodiment, a method for providing a location based service (LBS) in a point-to-multipoint broadcasting system comprises, in a mobile station, receiving a transmitter identifier (ID) from a point-to-multipoint transmitter, and obtaining location information based on the transmitter ID. The method also comprises determining a service area for the LBS based on obtained location information, in the mobile station.

The method may further comprise updating stored location information in the mobile station based on the obtained location information. The method may further comprise receiving an LBS selection from a user, and transmitting the LBS selection to the point-to-multipoint transmitter. The method may further comprise receiving the LBS from the point-to-multipoint transmitter based on transmitted LBS selection.

The point-to-multipoint broadcasting system may comprise a digital multimedia broadcast (DMB) system. The DMB system may comprise at least one of a satellite DMB system and a terrestrial DMB system. The method may further comprise determining whether the received LBS data is according to the transmitted LBS selection. The service area and a type of LBS service may be selected from a preset menu in the mobile station by a user. The service area may comprise a specific cell or a plurality of cells inside a DMB communication network. The service area may comprise an administration district unit or a circle radius range in the DMB communication network.

The LBS may be included in a data frame received from the point-to-multipoint transmitter. The data frame may comprise an identifier for identifying broadcasting image data and LBS data. The data frame may comprise an area identifier for identifying area information in LBS data. The data frame may comprise an information identifier for identifying types of information in LBS data.

In another embodiment, a method provides a location based service (LBS) in a point-to-multipoint broadcasting system, in which a mobile station obtains and updates location information based upon a transmitter identifier (ID) received from a point-to-multipoint transmitter.

Figure 1:
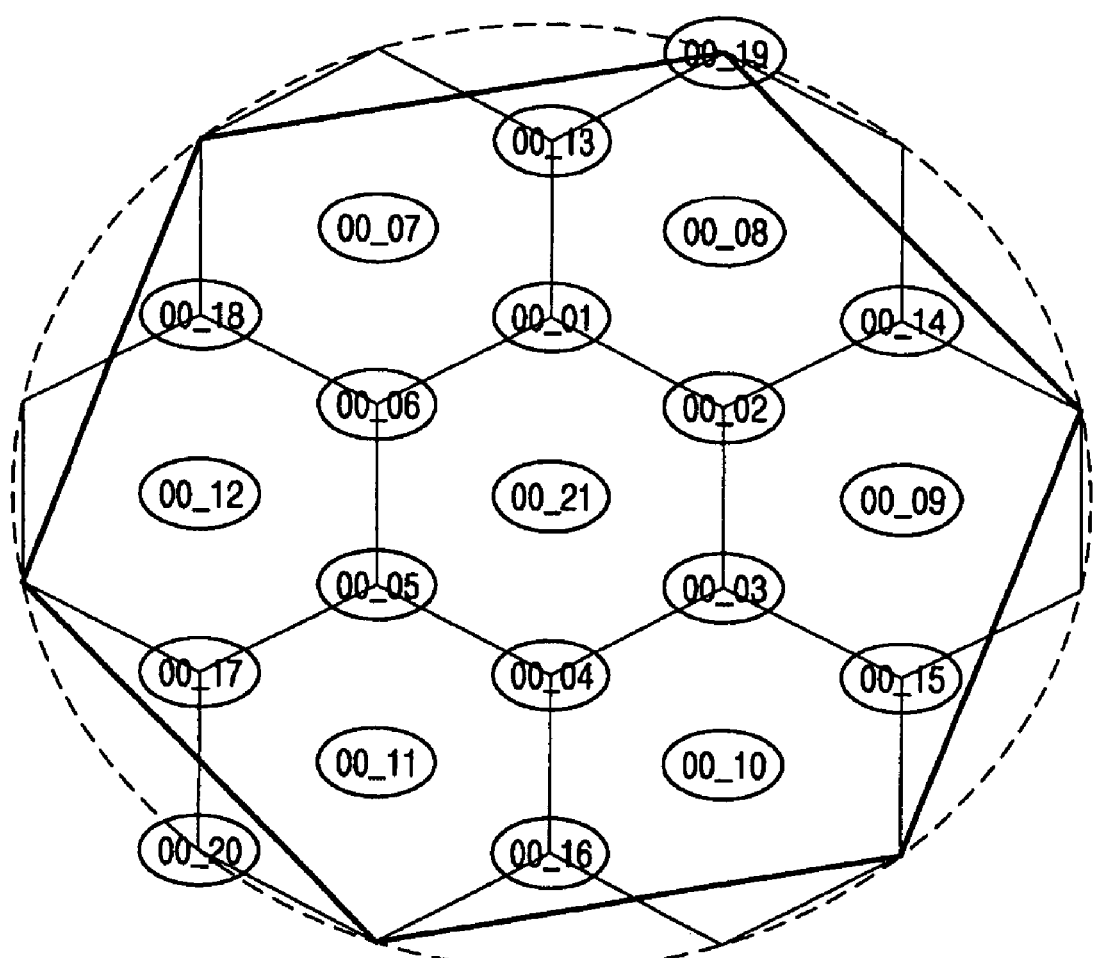
FIG. 1 is a diagram illustrating provision of a transmitter ID in a conventional Eureka-147 communication network.

The present invention may be implemented not only in a unidirectional DMB system but also in a bi-directional DMB system in which a base station ID is allocated to each base station of a mobile communication network, such as that shown in FIG. 1.

Using the present invention, in the LBS for a satellite DMB system and/or a terrestrial DMB system, location information associated with a mobile station may be obtained and updated using a transmitter ID associated with the DMB transmitter of the unidirectional DMB system. Accordingly, it is not necessary to provide a specified service to each user. Such operation may reduce user costs associated with the LBS and also may protect user privacy by not revealing user location information.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method for providing a location based service (LBS) in a digital multimedia broadcast (DMB) system, the method comprising:

in a mobile station:
receiving a transmitter identifier (ID) from a DMB transmitter;
obtaining location information based on the transmitter ID;
determining a service area for the LBS based on the obtained location information;
updating stored location information in the mobile station based on the obtained location information;
selecting a type of LBS data to be received;
receiving a data frame comprising at least broadcasting image data or the LBS data from the DMB transmitter, the LBS data comprising information pertaining to the determined service area;
determining whether the LBS data is included in the received data frame by checking a presence of a LBS data identifier, the presence of the LBS data identifier in the received data frame indicating that the LBS data is included in the received data frame and the absence of the LBS data identifier in the received data frame indicating that the broadcasting image data is included in the received data frame;

determining whether the LBS data in the received data frame corresponds to the selected type; and obtaining the LBS data corresponding to the selected type, wherein the DMB transmitter is located within the service area and the LBS is unidirectional and is received by utilizing the location information of the mobile station obtained from the DMB transmitter.

2. The method of claim 1, wherein the DMB system comprises at least one of a satellite DMB system and a terrestrial DMB system.

3. The method of claim 1, wherein the service area and the type of the LBS data are selected from a preset menu in the mobile station by a user.

4. The method of claim 2, wherein the service area comprises a specific cell or a plurality of cells inside a DMB communication network.

5. The method of claim 2, wherein the service area comprises an administration district unit or a circle radius range in the DMB communication network.

6. The method of claim 3, further comprising:
determining whether the received LBS data corresponds to a LBS selection transmitted to the DMB transmitter.

7. The method of claim 1, wherein the mobile station and the DMB transmitter are in the same service area.

8. The method of claim 1, wherein a range of the service area is designated by a user of the mobile terminal.

9. The method of claim 8, wherein the range is designated with respect to a current location of the mobile terminal.

10. The method of claim 1, wherein the data frame further comprises an information identifier for identifying the type of the LBS data.

11. The method of claim 1, further comprising:
transmitting information regarding the selected type of the LBS data to the DMB transmitter.

12. The method of claim 1, further comprising:
displaying the obtained LBS data corresponding to the selected type.

13. The method of claim 1, further comprising:
storing the obtained LBS data corresponding to the selected type in a memory of the mobile station.

14. The method of claim 13, further comprising:
discarding the LBS data that is not selected among the received LBS data.

15. The method of claim 1, wherein the data frame further comprises an area identifier for identifying area information in the LBS data.

16. The method of claim 1, wherein the LBS data comprises information regarding at least traffic or weather in the service area.

17. The method of claim 16, wherein the LBS data further comprises information regarding a restaurant in the service area.

18. The method of claim 1, wherein a current location of the mobile station is not reported to the DMB transmitter.

19. A mobile station configured to receive a location based service (LBS) in a digital multimedia broadcast (DMB) system, the mobile station comprising:
means for receiving a transmitter identifier (ID) from a DMB transmitter;
means for obtaining location information based on the transmitter ID; and
means for determining a service area for the LBS based on obtained location information; and means for updating stored location information in the mobile station based on the obtained location information, wherein the mobile station is further configured to:
select a type of LBS data to be received;
receive a data frame comprising at least broadcasting image data or the LBS data from the DMB transmitter, the LBS data comprising information pertaining to the determined service area;
determine whether the LBS data is included in the received data frame by checking a presence of a LBS data identifier, the presence of the LBS data identifier in the received data frame indicating that the LBS data is included in the received data frame and the absence of the LBS data identifier in the received data frame indicating that the broadcasting image data is included in the received data frame;
determine whether the LBS data in the received data frame corresponds to the selected type; and
obtain the LBS data corresponding to the selected type,
wherein the DMB transmitter is located within the service area and the LBS is unidirectional and is provided to the mobile station by utilizing the location information of the mobile station obtained from the DMB transmitter.

20. The mobile station of claim 19, wherein the DMB system comprises at least one of a satellite DMB system and a terrestrial DMB system.

21. The mobile station of claim 19, further comprising:
means for determining whether the received LBS data corresponds to a LBS selection transmitted to the DMB transmitter.

22. The mobile station of claim 19, wherein the mobile station and the DMB transmitter are in the same service area.

23. The mobile station of claim 19, further configured to transmit information regarding the selected type of the LBS data to the DMB transmitter.

24. The mobile station of claim 19, further configured to display the obtained LBS data corresponding to the selected type.

25. The mobile station of claim 19, further configured to store the obtained LBS data corresponding to the selected type in a memory of the mobile station.

26. The mobile station of claim 25, further configured to discard the LBS data that is not selected among the received LBS data.

27. A location based service (LBS) system comprising:
a digital multimedia broadcast (DMB) system provided with a plurality of cells for transmitting at least LBS data or broadcasting data to a DMB transmitter of each of the plurality of cells, the DMB transmitter inside each of the plurality of cells transmitting an associated transmitter identifier (ID) with the at least LBS data or broadcasting data;
a mobile station for receiving the transmitter ID to obtain location information; and
a broadcasting terminal for obtaining and updating its own location information inside a communication network through a geographical information data base (DB) by receiving the transmitter ID, and for receiving the at least LBS data or broadcasting data,
wherein the LBS is unidirectional, and
wherein the broadcasting terminal is configured to:
select a type of the LBS data to be received;
receive a data frame comprising at least the broadcasting image data or the LBS data from the DMB transmitter, the LBS data comprising information pertaining to the determined service area;

determine whether the LBS data is included in the received data frame by checking a presence of a LBS data identifier, the presence of the LBS data identifier in the received data frame indicating that the LBS data is included in the received data frame and the absence of the LBS data identifier in the received data frame indicating that the broadcasting image data is included in the received data frame;

determine whether the LBS data in the received data frame corresponds to the selected type;

obtain the LBS data corresponding to the selected type;

store the LBS data corresponding to the selected type in a memory of the mobile station; and discard the LBS data that is not selected among the received LBS data.

28. The LBS system of claim 27, wherein the mobile station and the DMB transmitter are in the same service area.

* * * * *